Patented Feb. 25, 1936

2,031,946

UNITED STATES PATENT OFFICE 2,031,946

SKIP LOADING MECHANISM

Frank H. Goodell, East Cleveland, Ohio, and Charles W. Ross, Philadelphia, Pa., assignors to The C. O. Bartlett & Snow Company, Cleveland, Ohio, a corporation of Ohio Application June 16, 1931, Serial No. 544,736

5 Claims. (Cl. 214—125)

Our invention relates to loading machanism for handling material, such as stone, coal, coke and the like, and provides a means whereby the several steps of the operation are so inter-related and actuated that the movement of a container to and from the loading position sets in motion and automatically controls the said several steps and transfers material from a storage bin to the said container. Our invention operates independently of the load in the container and therefore is not actuated prematurely by the impact of a large mass dropping therein as happens in a loading mechanism which is actuated by the weight of the loaded container.

The various features, combination of features, and construction details of our invention, and the preferred means adopted in the herein stated adaptation thereof, appear from the following described exemplification.

In the said annexed drawings:—

Figure 1:
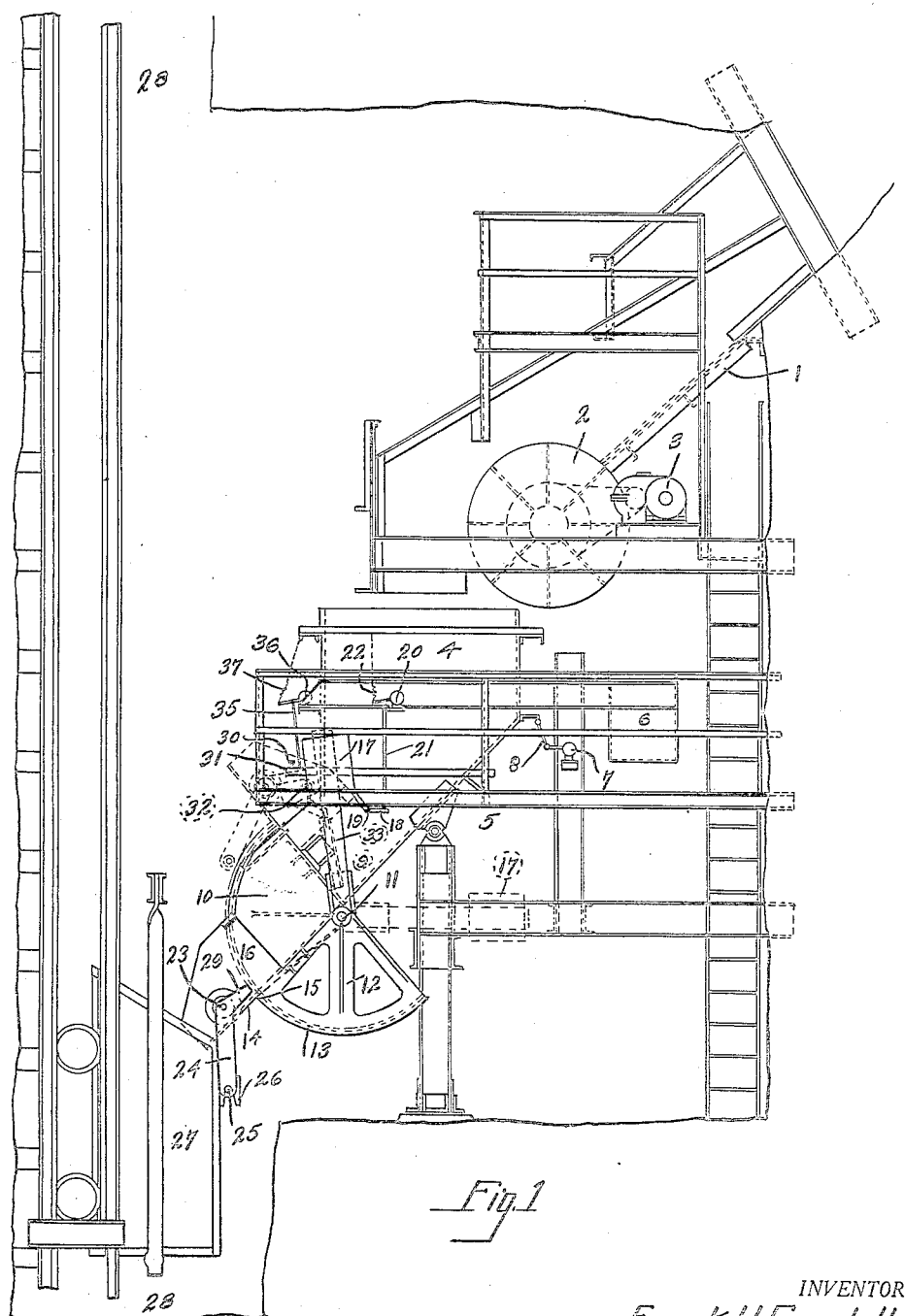
Fig. 1 is a side elevation of a loading mechanism, according to our invention, used in connection with a skip-hoist in a mine shaft.
Figure 2:
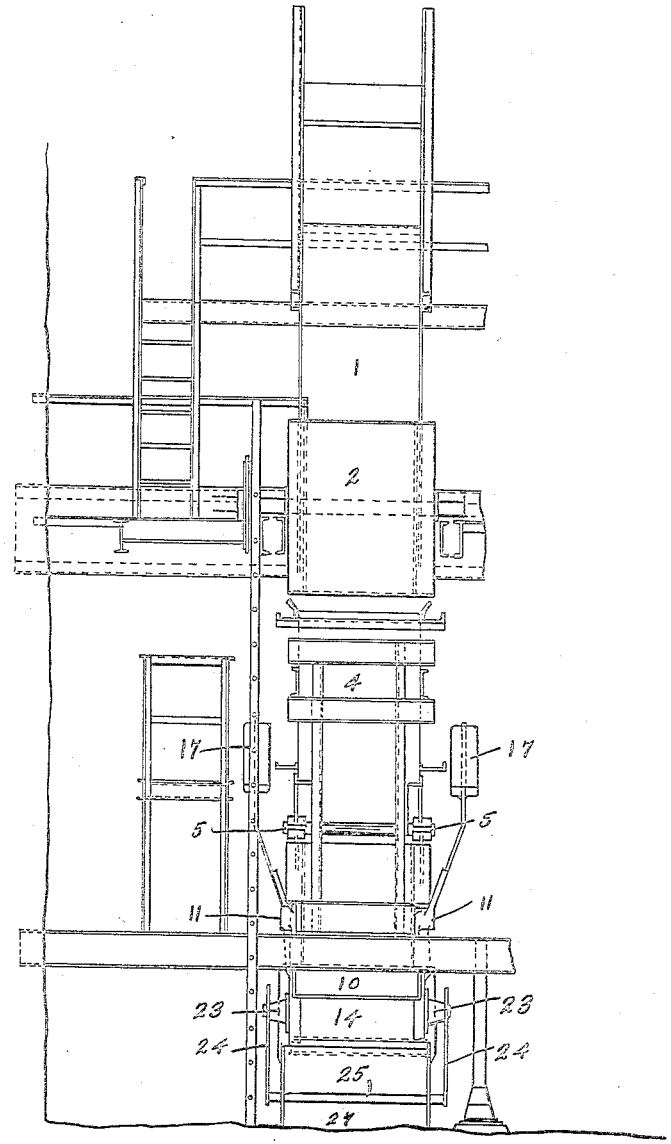
Fig. 2 is a rear elevation of same from a point looking toward the shaft.
Figure 3:
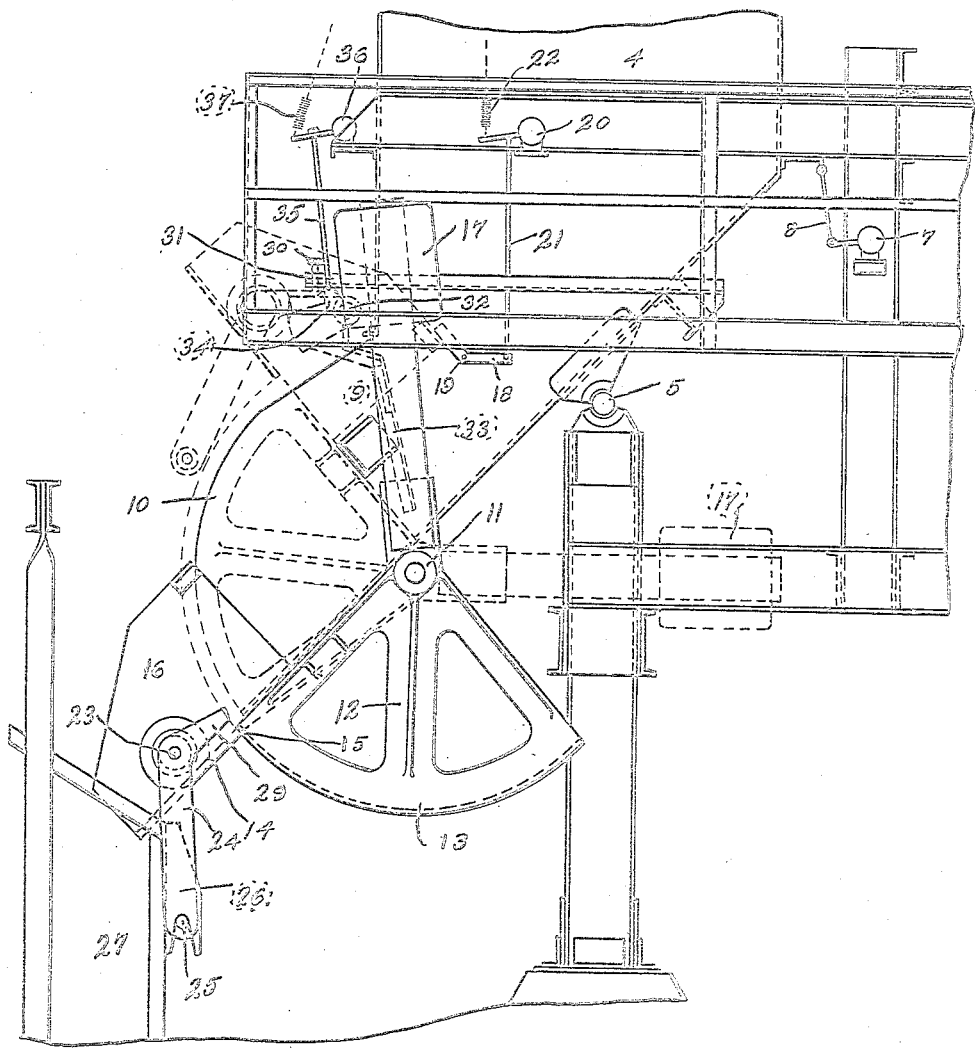
Fig. 3 is a side elevation of the weighing hopper and chute-gate with the latter in the open or discharge position, and in broken lines showing the chute-gate in the closed position.

For the purpose exemplified we provide a chute 1 to conduct material from a source of supply to a rotary drum feeder 2 which is operated, through a chain-drive combined with reduction gears, by a motor 3. Below the feeder is located a weighing hopper or transfer bin 4 carried by a bearing 5, and balanced by a counterweight 6. Said hopper is constructed with a bottom sloping abruptly toward the shaft 28. The said hopper with its attachments is balanced by adjustment of said counterweight 6 so that when empty it tilts slightly toward the shaft 28, by rotation about the bearing 5 until it encounters a stop placed on the framework supporting the apparatus, and so that when containing a predetermined load the hopper tilts slightly away from the shaft 28 by similar rotation until encountering another similar stop. The counterweight 6 as shown is a box which is adjusted by increasing or decreasing the contents thereof. Conveniently located on the framework supporting the apparatus is an electric switch 7 in a circuit controlling the operation of the motor 3. A rod 8 pivoted to the hopper is so attached to the operating lever of the switch 7 that when the hopper is empty the switch is closed and when the hopper is loaded the switch is opened, thereby stopping the motor 3.

In the lower part of the hopper 4 toward the shaft 28 is a discharge opening 9, and the bottom and sides of said hopper are continued to form a chute 10, leading from the discharge opening 9 toward the shaft 28. Carried by bearings 11, attached to the bottom of the hopper 4 on the outside thereof immediately below the discharge opening 9, and closing the mouth of the chute 10, is an undercut gate 12. The curved plate 13 forming the front of the gate 12 carries a flat plate 14 extending outwardly therefrom in radial relation thereto and affixed to the upper edge 15 thereof. When the gate 12 is open the flat plate 14 lies in the plane of the hopper bottom and with attached vertical sides 16 overlapping on the outside the sides of the discharge chute 10 of the hopper 4, constitutes an extension of said chute 10.

The undercut gate 12 is held shut normally by counterweights 17 carried on levers extending away from said shaft 28 and so positioned that when the gate 12 is in a fully open position the said counterweights 17 are moved forward of the bearings 11, or on the shaft side, and hold the gate 12 in the open position.

One vertical side 16 of the chute portion of said gate 12, as the gate assumes a closed position, moves one arm of an angular lever 18, pivoted at its angle 19 and, through movement of the other arm, closes a switch 20, the closing lever of which is attached to said other arm by a rod 21. Said switch is attached in a convenient location on the framework supporting said apparatus and is held normally open by the tension of the spiral spring 22.

The electric switches 7 and 20 are connected in series in an electric circuit which controls the operation of the motor 3.

Suspended from the pivots 23 carried on either side of the supplemental chute attached to the gate 12 are flat rods 24, the lower ends of which are connected by a round iron rod 25 so positioned as to be engaged by dogs 26, affixed to the corners of the skip 27, and extending toward the hopper 4. Said skip 27 is raised and lowered in a shaft 28, and when raised, from a loading position beneath the flat plate 10 of the extension chute carried by the gate 12, lifts said gate and in cooperation with counterweight 17, closes it. As the gate moves to the closed position, short angular arms 29 carried by the rods 24 near the pivots 23 are caught under the ends of adjustable screws 30 set in projecting members 31 of the supporting frame, and thereby held. This maintains the flat rods 24 and their connecting rod 25 in correct position to engage the dogs 26 attached to the skip when it is lowered.

Hanging from the bearings 32 located at the upper edge of the discharge opening 9 in the hopper 4 is a swinging gate 33 formed of one or more flat sheets united together and suspended vertically across the path of material discharging from said hopper 4. A lever 34 affixed to said swinging gate 33 near the bearing 32 is pivotally connected at its free end with a rod 35, pivotally connected to the closing lever of an electric switch 36, in an electric circuit controlling a signalling device at the mouth of the shaft 28. This switch 36 is attached to the supporting frame in a convenient location, and is normally held open by a spiral spring 37, but is closed by the action of the lever 34 when the gate is free to drop into its normal vertical position.

It will be clearly seen that when the skip is at the top of the shaft operation may be started and continued as follows:—An operating current is fed to the motor 3; the hopper 4 is closed and empty, therefore both the control switches 7 and 20 are closed and the motor 3 is free to operate the drum feeder 2 which drops material into the hopper 4, which material as it is later discharged from the hopper lifts the gate 33, permitting the spring 37 to open the switch 36; when a predetermined weight has been placed therein the hopper tilts and opens the control switch 7 and the motor ceases to operate the drum feeder; the skip 27 is lowered in the shaft 28 and the dogs 26 engage the cross rod 25, pulling the gate 12 down into an open position, thereby allowing the electric switch 20 to open; the material discharges by gravity from the hopper 4 to the skip 27 and the empty hopper then tilts back to its original position closing the switch 7, but the motor is still inoperative because switch 20 in series with switch 7 is still open; the discharge of the material from the hopper permits the swinging gate 33 to drop to its normal position, and the lever 34, through the rod 35 closes the switch 36, sending a signal to the mouth of the shaft, indicating that the hopper is empty and the skip loaded; the skip 27 is raised and lifts the chute-gate 12, in cooperation with the counterweights 17, closing said gate and also closing the switch 20; both control switches being now closed, the motor 3 operates the drum feeder 2 until the hopper is again loaded; and the aforesaid series of operations is repeated.

It will be seen that our invention is particularly suitable for use with skip hoists for handling materials in a mine or pit and provides a means for complete control of the operation from a distant point, for instance at the mouth of the pit or shaft. But obviously it may be used in connection with the lateral movement of material; and combined with control mechanism for the container or skip, which mechanism is actuated by the force through which the discharge of material transmits a signal, may be made to provide for the continuous and wholly automatic movement of materials.

Other modes of applying the principles of our invention may be employed instead of the one explained, change being made as regards the means and the steps herein disclosed, provided those stated by any of the following claims or their equivalent be employed.

We therefore particularly point out and distinctly claim as our invention:—

1. In combination in an apparatus for handling material, a weighing hopper oscillatably mounted on a bearing so positioned relative to the weight and the shape of said hopper that when empty said hopper will tilt on said bearing and when containing a predetermined quantity of the material to be handled will tilt the opposite way, a gate closing a discharge opening in said hopper which gate is normally held closed, a bucket, means to move said bucket to and from loading position beneath said gate, means carried by said bucket adapted to engage and open said gate as said bucket approaches loading position, means adapted to feed material to said hopper including a motor controlled by an electric circuit, a switch in said circuit normally held open, means adapted to close said switch when said hopper is tilted in empty position, a second switch in said circuit normally held open and means adapted to close said second switch when said gate is in closed position, an element pivotally suspended across the discharge opening of said bin adapted, by its movement responsive to discharge of material, to control a switch in an electric circuit which includes the station from which the movement of said skip is controlled.

2. In combination in an apparatus for handling material, a weighing hopper oscillatably mounted on a bearing, so positioned relative to the weight and the shape of said hopper that when empty said hopper will tilt on said bearing and when containing a predetermined quantity of the material to be handled will tilt the opposite way, an under-cut gate closing a discharge opening in said hopper which gate is normally held closed by a counter-weight so positioned that its weight will act to hold said gate closed when in the closed position and will act to hold said gate open in the open position, a bucket, means to move said bucket to and from loading position beneath said gate, means carried by said bucket adapted to engage and open said gate as said bucket approaches loading position, a spout carried on said gate adapted to extend beyond the adjacent wall of said bucket in the loading position, means adapted to feed material to said hopper including a motor controlled by an electric circuit, a switch in said circuit normally held open, means adapted to close said switch when said hopper is tilted to empty position, a second switch in said circuit normally held open and means adapted to close said second switch when said gate is in closed position, said switches being in series in said circuit.

3. In combination in an apparatus for handling material, a weighing hopper tiltably mounted on a bearing so positioned relative to the weight and shape of said hopper that when empty said hopper will tilt on said bearing and when containing a predetermined quantity of material will tilt the opposite way; and opening so positioned in said hopper that material therein will discharge therethrough by gravity; a gate adapted to close said opening; means adapted to hold said gate in a closed position; a container adapted to be moved to and from loading position beneath said opening; means adapted to move said gate to open and to closed positions responsive to movement of said container to and from loading position; means adapted to feed material to said hopper which means is controlled electrically; an electric circuit including a switch, carrying an electric current controlling said last named means; means adapted to operate said switch responsive to movement of said hopper as it tilts to and from empty position; a second switch in said circuit in series with said first switch; means adapted to operate said second switch responsive to movement of said gate to and from closed position; a second circuit including a switch and a station controlling movement of said container; and means adapted to operate said last-named switch responsive to passage of material through said hopper.

4. In combination in an apparatus for handling material, a weighing hopper tiltably mounted on a bearing so positioned relative to the weight and shape of said hopper that when empty said hopper will tilt on said bearing and when containing a predetermined quantity of material will tilt the opposite way; an opening so positioned in said hopper that material therein will discharge therethrough by gravity; a gate adapted to close said opening; means adapted to hold said gate in a closed position; a container adapted to be moved to and from loading position beneath said opening; means adapted to move said gate to open and to closed positions responsive to movement of said container to and from loading position; means adapted to feed material to said hopper which means is controlled electrically; an electric circuit, including a switch, carrying an electric current controlling said last named means; means adapted to operate said switch responsive to movement of said hopper as it tilts to and from empty position; a second switch in said circuit in series with said first switch; and means adapted to operate said second switch responsive to movement of said gate to and from closed position.

5. In combination in an apparatus for handling material, a weighing hopper tiltably mounted on a bearing so positioned relative to the weight and shape of said hopper that when empty said hopper will tilt on said bearing and when containing a predetermined quantity of material will tilt the opposite way; an opening so positioned in said hopper that material therein will discharge therethrough by gravity; a gate adapted to close said opening; means adapted to hold said gate in a closed position; a container adapted to be moved to and from loading position beneath said opening; means adapted to move said gate to open and to closed positions responsive to movement of said container to and from loading position; means adapted to feed material to said hopper which means is controlled electrically; an electric circuit, including a switch carrying an electric current controlling said last named means; means adapted to operate said switch responsive to movement of said hopper as it tilts to and from empty position; and a second circuit including a switch and a station controlling movement of said container; and means adapted to operate said last named switch responsive to passage of material through said hopper.

FRANK H. GOODELL.
CHARLES W. ROSS.